3,147,211
PROCESS FOR TREATING PETROLEUM DISTILLATES

William T. Robinson, Wilmington, Del., assignor to E. I. du Pont de Nemours and Company, Wilmington, Del., a corporation of Delaware
No Drawing. Filed June 7, 1963, Ser. No. 286,211
9 Claims. (Cl. 208—332)

This invention relates to a novel process for treating petroleum distillates, particularly to the selective solvent refining thereof.

Petroleum distillates result, in part, from the distillation of crude petroleum. They occur in several grades ranging from highly volatile liquefied gases and gasoline-like materials to very heavy oils. Petroleum distillates also occur as mixtures of partially refined materials or as mixtures of refinery by-products or intermediates and crude distillates. Without further treatment, these distillates contain a variety of materials which it is desirable to remove for various reasons. For example, many of these distillates contain compounds which form tars, sludges or colors when heated or when exposed to air. Others contain aromatic compounds and the like which it is often desirable to remove and frequently to recover. Sulfur bodies usually have to be removed since they cause sour odors, acidity and corrosion.

A variety of methods are presently known for treating petroleum distillates, often for specific purposes. Some which may be mentioned include treatment with sulfuric acid, liquid hydrogen fluoride, dialkylamides, pyrrolidones, fluorosulfonic acid formaldehyde, unsubstituted ketones, and the like, treatment with solid adsorbents, codistillation with various solvents, and a variety of others. Generally, each method accomplishes one or two purposes only, for example removing sulfur bodies, nitrogenous bodies, unsaturates or aromatics.

It is an object of this invention to provide a process for treating petroleum distillates so as to remove impurities or undesired components thereof. Another object is to provide a process which accomplishes a variety of purification steps simultaneously. A further object is to provide a treatment process which does not employ strongly acidic materials. A particular object is to provide a selective solvent extraction process for removing undesired impurities or components from petroleum distillates. Other objects are to advance the art. Still other objects will appear hereinafter.

The above and other objects may be accomplished by the process for the selective solvent refining of petroleum distillates, which process comprises (A) Intimately contacting 1 volume of the petroleum distillate to be refined in the liquid phase at a temperature of from about 0° C. to about 100° C.
(B) With at least 0.1 volume of a liquid hydrate of a saturated aliphatic polyhaloketone in which the polyhaloketone consists of
  (a) 3 to 15 carbon atoms,
  (b) One oxygen atom,
  (c) 0 to 2 hydrogen atoms, and
  (d) Halogen atoms of atomic numbers 9–17 of which at least 50 atom percent are fluorine atoms, there being no more than 1 hydrogen atom on a carbon atom adjacent to the CO group,
said hydrate containing 1 to about 10 moles of water of hydration per mole of polyhaloketone sufficient to form a two-phase system of (1) a liquid hydrate solvent phase and (2) a liquid raffinate phase, and
(C) Then separating the raffinate phase from the solvent phase.

The petroleum distillates, which may be treated by the process of this invention, have a wide range of properties and compositions. Some of these distillates are obtained by distillation of crude oil, and include gasoline, kerosene, gas-oil, lubricating oil stocks, and the like. Some typical distillation ranges are: liquefied petroleum gas —48° F. to +34° F., aviation gasoline 90° F. to 300° F., motor gasoline 90° F. to 410° F., kerosene 350° F. to 550° F., jet fuel 100° F. to 550° F., cleaner's naphtha 300° F. to 400° F., distillate fuel oil 400° F. to 700° F., refinery gas-oil 400° F. to 750° F., and residual oil above 750° F. In this invention, petroleum distillate means any petroleum fraction containing material boiling up to 750° F. as is usually understood in the art. Other petroleum distillates result from partial refining processes such as hydrogenation of crude distillate or similar treatments. Still other petroleum distillates result from mixing crude straight run distillates with refinery products of similar boiling range obtained from cracking, reforming or like operations. The petroleum distillates consist essentially of aliphatic hydrocarbons, naphthenic hydrocarbons, aromatic hydrocarbons, and mixtures of any two or more of those types of hydrocarbons in various proportions.

The petroleum distillates, as described above, may contain undesirable impurities such as hydrogen sulfide, mercaptans and the like, which need to be removed. They may also contain basic compounds (nitrogen-containing materials), aromatic hydrocarbons and/or olefines, which it may be desirable to remove, either because they are harmful in the particular distillate (e.g., aromatic hydrocarbons in jet fuel) or form colors or sludge when heated, or to recover them because they are more valuable otherwise. Crude oils vary considerably in their content of sulfur bodies, nitrogen compounds, aromatic hydrocarbons or olefines, depending on the source, as is well known to those skilled in this art. For a further discussion of petroleum distillates and the products in to which they may be converted, see Guthrie's "Petroleum Products Handbook," McGraw-Hill, 1960.

It has been found that, by treating petroleum distillates with the polyhaloketone hydrates as above defined, it is possible to obtain a wide variety of desirable and highly beneficial results. The hydrates of the polyhaloketones of this invention extract from petroleum distillates solid impurities, colored substances, sludge-forming materials and odorous compounds, including sulfur bodies such as hydrogen sulfide and mercaptans, basic nitrogen-containing compounds, and unstable olefines. Thereby, there is obtained improvements in various properties of the petroleum distillates such as their viscosity, viscosity index, ASTM slope, pour point, oxidation stability, color, color stability, odor, and sludge stability. Also, the lower hydrates are significantly better solvents for aromatic hydrocarbons than for naphthenic hydrocarbons, and are better solvents for naphthenic hydrocarbons than for paraffinic hydrocarbons. Thereby, the process of this invention is useful for treating petroleum distillates, which are mixtures of aromatic and naphthenic or paraffinic hydrocarbons, to separate such distillates into a predominantly aromatic fraction and a prodominantly naphthenic or paraffinic fraction.

The polyhaloketones, the hydrates of which are used in the process of this invention, are those which consist of 3–15 carbon atoms, one oxygen atom, 0 to 2 hydrogen atoms, and halogen atoms of atomic numbers 9–17 of which at least 50% are fluorine atoms, there being no more than 1 hydrogen atom on a carbon atom adjacent to the CO group. The polyhaloketones may be acyclic (open chain) or alicyclic (saturated cyclicaliphatic) ketones, but preferably are acyclic polyhaloketones of 3–7 carbon atoms. In general, the polyhaloketones and their hydrates, which are employed in the process of this invention, are known to the art.

Some typical examples of the acyclic ketones are:

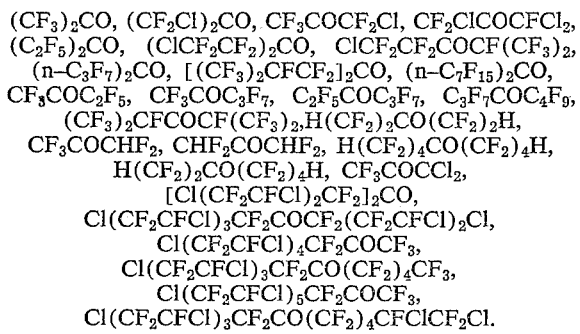

Of these, the perhaloacetones (completely halogenated acetone), in which at least 3 of the halogen atoms are fluorine atoms and the rest are chlorine atoms, are preferred, particularly dichlorotetrafluoroacetone and hexafluoroacetone.

The acyclic polyhaloketones are prepared by one or more well known methods. For example, they may be prepared by the oxidation of olefines with potassium permanganate or the like. Also, they may be prepared by the reaction of acid halides, esters or nitriles with Grignard reagents in the manner disclosed by Barnhart et al. in U.S. Patent 2,824,139. The Grignard reagents $R\ CF_2MgI$ are prepared from the corresponding iodides, e.g., $F(CF_2)_nI$, $ClCF_2CFCl(CF_2)_nI$ and the like, which are well known to the art. The acid halides, esters and nitriles are also well known to the art. Other sources of acyclic ketones are the hydrolysis of vinyl ethers $$C_nF_{2n+1}CF=C(OR)C_{n'}F_{2n'+1}$$

(Ruh, U.S. Patent 2,715,144), the oxidation of

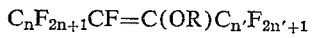

with oxygen and fluorine (Miller, U.S. Patent 2,712,555), the oxidation of olefines $R_fCX=CClR_f'$ to $R_fCXClCOR_f'$ (Miller, U.S. Patent 2,712,554), and the oxidation of secondary alcohols such as $H(CF_2)_nCH(OH)(CF_2)_mH$, wherein X is halogen and $R_f$ is perfluoroalkyl. Ketones are also obtained by treating esters of perhalogenated acids with sodium (Hauptschein, U.S. Patent 2,802,034).

The alicyclic ketones contain carbocyclic rings, usually of four to six carbons. These rings may be substituted with perfluoro or perchlorofluoroalkyl groups. Some typical examples of these alicyclic ketones are perfluorocyclobutanone,
perfluorocyclopentanone,
perfluorocyclohexanone,
perfluoromethylcyclobutanone,
perfluoroethylcyclobutanone,
perfluorobutylcyclobutanone,
perfluorohexylcyclobutanone,
perfluoromethylcyclohexanone,
perfluoroethylcyclopentanone,
perfluorooctylcyclohexanone,
chloropentafluorocyclobutanone,
dichlorotetrafluorocyclobutanone,
chloroheptafluorocyclopentanone,
chlorononafluorocyclohexanone,
1,2-dichlorotrifluoroethylpentafluorocyclobutanone, and
dichlorooctafluorocyclohexanone.

The perhalocyclobutanones are most readily obtained by the reaction of perhaloalkylenes with perhalovinyl alkyl ethers, i.e.

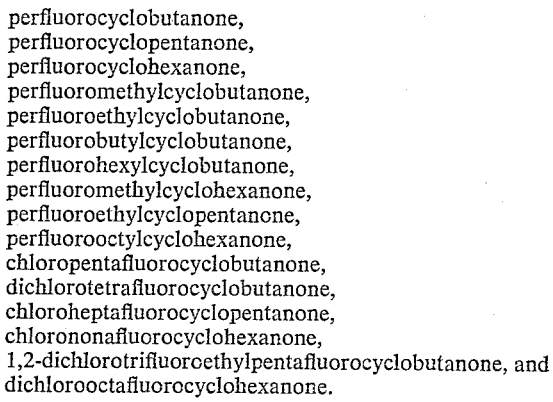

wherein X is halogen, the ether products of which reaction are readily hydrolyzed to the corresponding ketones (England, U.S. Patent 3,040,058). The alicyclic ketones may also be prepared by the oxidation of perhalocycloolefines with oxygen and fluorine (Miller, U.S. Patent 2,712,554). The polyhaloketones of this invention may also be prepared according to well known procedures by reaction with HF over a catalyst, such as that of Miller et al. in U.S. Patent 2,853,524.

All of the aforementioned types of polyhaloketones form very stable hydrates with water. Many can be distilled without decomposition. In general, those containing one mole of water of hydration are easily distilled. The simplest hydrates are the gem-diols containing one mole of water. However, the polyhaloketones also form higher hydrates which contain more than one mole of water, up to 10 moles usually. Strong dehydrating agents, such as phosphorous pentoxide, are usually required to remove the water from these hydrates.

The hydrates of the polyhaloketones of this invention are simply prepared by mixing the ketone with the required amount of water with agitation at normal room temperatures. Some heat is evolved in the reaction and care must be taken to prevent local overheating, good agitation usually being sufficient for this purpose, although cooling may be employed if desired.

The hydrates of the polyhaloketones of this invention have limited solubility in the petroleum distillates. This solubility decreases with increase in the water of hydration and with increase in the molecular weight of the polyhaloketone. In the practice of this invention, the amount of the water of hydration in the hydrates will be dependent in part upon the polyhaloketone employed, in part on the chemical composition of the petroleum distillate, in part on the temperature employed, and in part upon the results desired. The amount of water of hydration must be sufficient to form a two-phase system of (1) a liquid hydrate solvent phase and (2) a liquid raffinate phase, when the desired relative proportions of hydrate and petroleum distillate are mixed and then allowed to settle. Therefore, in general, the amount of water hydration will vary with the polyhaloketone, the lower molecular weight polyhaloketones requiring higher hydration than those of higher molecular weight. With any particular polyhaloketone, the amount of hydration required generally increases with the average molecular weight of the hydrocarbons in the petroleum distillate. Also, in general, with any particular petroleum distillate, the amount of hydration required decreases with increasing molecular weight of the polyhaloketone. Further, in general, the solubility of a hydrate in a petroleum distillate decreases with decrease in temperature. The amount of water of hydration which is used also depends on the efficiency of the extraction desired, the lower hydrates in general being more efficient than the higher hydrates, particularly for removing non-hydrocarbon impurities from the petroleum distillates. Sulfur compounds and basic nitrogen compounds are more easily extracted than aromatic hydrocarbons and, when the petroleum distillate contains aromatic hydrocarbons as well as sulfur compounds and basic nitrogen compounds, the sulfur compounds and the basic nitrogen compounds will be preferentially extracted from the distillate.

The amount of aromatic hydrocarbons removed in a particular case may be decreased by the use of more water, that is, by the use of a hydrate of higher hydration, which decreases the solubility of the aromatic hydrocarbon in the hydrate. This decrease in the solubility of aromatic hydrocarbons with increase in the degree of hydration of the hydrate is also useful where it is desired to remove aromatic hydrocarbons from admixture with naphthenic and paraffinic hydrocarbons and to recover the aromatic hydrocarbons from the hydrate solution. For example, a hydrate of a low degree of hydration, in which the aromatic hydrocarbons are highly soluble, can be used to extract aromatic hydrocarbons from admixture with naphthenic and aliphatic hydrocarbons and then recovering the aromatic hydrocarbons from their solution in the hydrate by treating the solution with additional amounts of water to render the aromatic hydrocarbons insoluble in the hydrate.

The foregong various factor will be balanced for specific applications of the process of this invention. However, for most purposes, the hydrate will contain from 1 to about 4 moles of water of hydration. The amount of water required for any particular case, can be readily determined by mixing small measured volumes of the particular petroleum distillate to be treated and of the monohydrate of the particular polyhaloketone to be employed and, if it is found that the two are mutually soluble, adding small measured amounts of water to the mixture until the two-phase system is formed. From the amount of water added, the degree of hydration required for larger scale operations is easily calculated.

Contacting the petroleum distillate with the hereinbefore described polyhaloketone hydrates is most readily carried out using conventional continuous techniques such as counter-current or cocurrent extraction. However, other methods, which bring the polyhaloketone hydrate into intimate contact with the petroleum distillate, may be used. The prime prerequisite for effective results is the intimate contact. The time duration of contact has an effect, efficiency increasing with time of contact. Like most extraction type processes, the present process involves an equilibrium of the material being extracted between the petroleum distillate and the polyhaloketone hydrate. For this reason, counter-current extraction methods operate effectively. If batch type extractions are used, the number of extractions increases the effectiveness of the removal of undesired materials. A point is reached where further extraction serves no useful purpose; the time or number of extractions required to reach this point being dependent on the nature of the material being extracted into the polyhaloketone hydrate.

The amount of polyhaloketone hydrate employed will depend upon the materials, particularly the amounts thereof, which are to be removed from the petroleum distillate. In general, there will be used at least 0.1 volume of hydrate for each volume of petroleum distillate, preferably, at least about one volume of the hydrate. Ordinarily, from about 1 to about 2 volumes of hydrate will be sufficient for most purposes. In some cases, up to 5 volumes of the hydrate will be desirable. Much larger amounts of hydrate may be used, but in general will be undesirable.

The process of this invention may be carried out at temperatures of from about 0° C. to about 100° C., but usually will be carried out at from about 25° C. to about 80° C., preferably at normal room temperatures, i.e., about 25° C. As noted hereinbefore, the hydrate and the petroleum distillate should have low solubility in each other so that a two-phase system is formed and this can be controlled by the amount of water in the hydrate. In many cases, the use of lower contacting temperatures also aids in forming the two-phase system by lowering the solubility of the hydrate and the petroleum distillate in each other. However, temperatures below 25° C., if extreme, cause slower extractions, requiring longer contact times or more extractions to obtain comparable results. The temperature should not be lowered to a point where the hydrate and/or the petroleum distillate become solid or very highly viscous. High temperatures, above 80° C., are less useful, although not excluded from this invention. Also, the upper temperature limits are determined by the stability of the polyhaloketone hydrates. Temperatures much above 100° C. serve no useful purpose.

Ordinarily the process will be carried out at atmospheric pressures, although higher and lower pressures can be employed, if desired. Particularly, elevated pressures will be used where the petroleum distillate is normally gaseous or highly volatile, employing those pressures that are required to maintain the petroleum distillate in the liquid phase.

After contacting the petroleum distillate with the polyhaloketone hydrate, the two phases are separated by any convenient means for separating two relatively immiscible liquids. Gravity separation and decantation is such a method. Counter-current extraction, by its very nature, results in separation of the two liquids. Any other known method for separating two relatively immiscible liquids of generally different density may be used, as will be apparent to those skilled in the art.

The separated polyhaloketone hydrate phase contains materials which have been extracted from the petroleum distillate. In many cases it is economically desirable to recover such materials as, for example, in the cases of aromatic hydrocarbons or olefines. This may be accomplished in a number of ways, depending primarily on the nature of the material to be recovered. Dilution of the hydrate phase with further water usually leads to separation of the aromatic hydrocarbons. Olefines are similarly separated. The excess water is then removed from the polyhaloketone hydrate by distillation. Another procedure is to distill the hydrate extract. This method is particularly useful if the material to be recovered is either relatively low boiling, i.e., has a boiling point below the boiling point of the hydrate, or if the hydrate is sufficiently stable to be distilled away from the extracted material. Fractionation of the extract may also be used. Hydrogen sulfide and mercaptans form relatively stable products or complexes with the polyhaloketones. These can be decomposed by treatment with strong aqueous acid.

The polyhaloketone hydrates are mildly acidic in nature, of about the same magnitude as acetic acid. For this reason, it is often preferable to contact the treated distillate (raffinate phase) with aqueous alkali or water to remove traces of the polyhaloketone hydrates. The hydrates and the polyhaloketones themselves are stable to acids and water, but should not be contacted with strong bases since highly halogenated carbonyl compounds tend to be cleaved by strong bases at the carbonyl group (the so-called haloform reaction).

The results of the treatment of petroleum distillates with the polyhaloketone hydrates may be measured in several ways. Colored matters are removed, improvements in viscosity, viscosity index and ASTM slope are obtained. Often, the pour points of oils are improved. Oxidation stability is increased, and solids and sludge-forming materials are removed. Both ASTM color ratings and "blotter ratings" are improved. The blotter rating is a measure of sludge-forming materials, and is described in detail in Example IV. The concentration of aromatic hydrocarbons, sulfur bodies, and the like are decreased, and odors are improved. All of these factors are important to petroleum refiners. The above improvements may be brought about by a plurality of various other prior art procedures, but no single other procedure is capable of making all of these improvements in a single, simple treatment.

In order to more clearly illustrate this invention, preferred modes of practicing it and the advantageous results to be obtained thereby, the following examples are given in which the parts and proportions are by weight except where specifically indicated otherwise. Also, except where specifically indicated otherwise, the petroleum distillates treated contained no additives, i.e., no antioxidants, metal deactivators, dyes, pour point improvers, antiknock agents, or the like.

EXAMPLE I

A 55 ml. portion of a solvent refined, naphthenic based stock, lubricating oil (solvent refined refers to treatment of the raw stock with a selective solvent to separate low from high viscosity index constituents; naphthenic based refers to an oil which has a relatively high proportion of naphthenes as differentiated from paraffinic or aromatic based stocks) was extracted twice by shaking with 25 ml. portions of dichlorotetrafluoroacetone monohydrate ($C_3F_4Cl_2O \cdot H_2O$), prepared by the reaction of equimolar amounts of the ketone and water. The extracted oil, which became considerably lighter in color, was washed with water and dried. It was then compared with the untreated oil, giving the following results.

| Oil | Viscosity (centistokes) at— | | Viscosity index (ASTM-D-567) | ASTM slope (100–210° F.) | Refractive index | Pour point, ° F. |
|---|---|---|---|---|---|---|
| | 210° F. | 100° F. | | | | |
| Untreated | 17.08 | 517.9 | −46 | 0.857 | 1.5169/30° C. | +10 |
| Treated | 16.09 | 420.1 | −24 | 0.842 | 1.5119/30° C. | +10 |

The dichlorotetrafluoroacetone monohydrate was recovered and reused.

EXAMPLE II

A 70 ml. portion of the oil used in Example I was extracted ten times with 30 ml. portions of dichlorotetrafluoroacetone monohydrate, after which essentially no further change occurred. The residual oil was washed with water, dried and compared as before with the following results.

| Oil | Viscosity (centistokes) at— | | Viscosity index (ASTM-D-567) | ASTM slope (100–210° F.) | Refractive index | Pour point, ° F. |
|---|---|---|---|---|---|---|
| | 210° F. | 100° F. | | | | |
| Untreated | 17.08 | 517.9 | −46 | 0.857 | 1.5169/30° C. | +10 |
| Treated | 12.85 | 208.3 | +36 | 0.794 | 1.4938/30° C. | +5 |

The dichlorotetrafluoroacetone monohydrate was recovered and reused.

It is apparent that the treatments, described in Examples I and II, lead to lower viscosities, higher viscosity indices, lower ASTM slopes and lower refractive indices. The pour point is also lowered in Example II. Treatment with water or dilute alkali, as used in this and the following examples, has no effect on the oils.

Each sample of oil, treated as described above in Example II, was then heated at 375° F. for 24 hours while 10 cm.² copper strips were immersed therein and 25 ml./min. of air was bubbled through the oil. The final oils had the following characteristics.

| Oil | Viscosity (centistokes) at— | | Viscosity index (ASTM-D-567) | ASTM slope (100–210° F.) | Pour point |
|---|---|---|---|---|---|
| | 210° F. | 100° F. | | | |
| Untreated | (¹) | (¹) | (¹) | (¹) | (¹) |
| Treated | 19.02 | 424.6 | +29 | 0.782 | +5 |

¹ Too opaque to be determined.

It is thus apparent that the treatment has greatly improved the thermal and oxidative properties of the oil.

EXAMPLE III

Fifty-five ml. of a high quality, solvent refined lubricating oil (a straight run, paraffinic base stock distillate of 100 viscosity index) was extracted with two 25 ml. portions of dichlorotetrafluoroacetone monohydrate.

$$(C_3F_4Cl_2O \cdot H_2O)$$

washed with water and dried. This extracted oil is designated "Extract Oil I" in Tables I and II below.

The same oil (150 ml.) was extracted 12 times with 25 ml. portions of dichlorotetrafluoroacetone monohydrate ($C_3F_4Cl_2O \cdot H_2O$) until no further color was removed, then washed with water and dried. This product is designated "Extract Oil II" in Tables I and II. These samples were subjected to the same tests as in the previous examples with the results shown in Table I.

These same oil samples were then subjected to the oxidative test described in Example II with the results shown in Table II. A commercial antioxidant, zinc, dibutyldithiocarbamate, was added to two of the samples.

*Table I*

| Oil | Viscosity (centistokes) at— | | | Viscosity index (ASTM-D-567) | ASTM slope | | Refractive index | Pour point, ° F. |
|---|---|---|---|---|---|---|---|---|
| | 210° F. | 100° F. | 0° F. | | 100–210° F. | 0–210° F. | | |
| Untreated | 6.31 | 43.53 | 4078 | 102 | 0.746 | 0.767 | 1.4812/20°C. | −15 |
| Extract I | 6.09 | 40.91 | | 101 | 0.745 | | 1.4757/24°C. | −20 |
| Extract II | 6.18 | 41.33 | 1908 | 105 | 0.737 | 0.723 | 1.4764/20°C. | −15 |

*Table II*

[Heating, 375° F., 24 hrs., air at 25 ml./min.]

| Oil | Viscosity (centistokes) at— | | Viscosity index (ASTM-D-567) | ASTM slope, 100–210° F. | Acid No. | Copper weight loss, mg./cm.² |
|---|---|---|---|---|---|---|
| | 210° F. | 100° F. | | | | |
| Untreated | 6.82 | 53.8 | 86 | 0.761 | 5.4 | 2.00 |
| Untreated +0.5% A | 7.46 | 50.1 | 119 | 0.697 | 5.1 | 0.38 |
| Extract I | 7.34 | 59.4 | 89 | 0.751 | 4.1 | 1.65 |
| Extract II +0.5% A | 6.29 | 42.60 | 105 | 0.737 | 0.9 | 0.13 |

A = zinc dibutyldithiocarbamate, a commercial antioxidant.

The dichlorotetrafluoroacetone hydrate was recovered and reused.

It is known in the art that highly purified or "over refined" oils are often less oxidatively stable than the oils from which they are derived. It is also known that these "over refined" oils are more susceptible to the action of antioxidants than the less refined materials. The results in Tables I and II indicate that the present oil is not less oxidatively stable after treatment than the original oil, and that the treated oil is much more susceptible to the action of antioxidants than the original oil.

The untreated oil was dark brown after the oxidative test and contained a heavy brown sludge. Extract oil I was dark brown and contained moderate sludge. The untreated oil-antioxidant combination was dark brown and contained moderate sludge. Extract Oil II-antioxidant combination was light brown with very little sludge. It is apparent that the treatment improved the properties of this oil.

EXAMPLE IV

A sample (200 ml.) of a No. 2 fuel oil (a blend of catalytically cracked cycle stock and straight run distillate, containing no additives but known to be unstable on standing) was extracted with eight portions of 30 ml. each of the hydrate formed from dichlorotetrafluoroacetone and 2.5 moles of water ($C_3F_4Cl_2O \cdot 2.5H_2O$). The fuel oil was then washed with aqueous alkali, water, and dried. The remaining 185 ml. of extracted fuel oil had the following properties before and after heating at 300° F. for 90 minutes.

| Oil | ASTM color (D-1500) | | Blotter rating |
|---|---|---|---|
| | Before heating | After heating | |
| Untreated | L2.0 | D8 | 20 |
| Treated | 0.5 | L2.5 | 4 |

From this test it is apparent that the treated oil is more stable than the untreated oil.

The dichlorotetrafluoroacetone hydrate was recovered and reused.

ASTM–D–1500 Color Test: The complete designation is "Tentative Method of Test for ASTM Color of Petroleum Products, ASTM Color Scale, ASTM Designation: D–1500–58T, issued 1957, Revised 1958." During the test, the sample is exposed to air at its surface, but air is not bubbled into the sample. A series of 16 glass color standards ranging from 0.5 (light) to 8.0 (dark) in 0.5 unit are compared with the sample using a colorimeter. If a sample is intermediate between two standards, the designation of the darker standard is reported preceded by the letter "L," meaning lighter than the color reported. The letter "D" means "darker than" but it is only used for samples having colors darker than 8.0, the top of the scale.

The blotter rating is obtained as follows: A sample (50 ml.) of the fuel or oil is filtered through a 4.25 cm. No. 1 Whatman filter paper by vacuum using a "Millipore" filter holder. The filter paper is then dried and compared with a set of standard filter papers. Ratings of 7 or below indicate useful materials. Those having ratings of 8 or higher contain sufficient solid materials to plug or otherwise foul nozzles, screens and the like.

The standard filter papers are prepared as follows: One-half gram of "Norit A" activated charcoal (a finely divided form) is suspended in 2500 ml. of n-heptane by good agitation. Various quantities, as listed in the table below, are withdrawn, diluted with n-heptane and filtered through 4.25 cm. No. 1 Whatman filter papers. Spraying of the filter papers with clear lacquer after filtering is recommended to prevent loss of the activated charcoal.

The following blotters are prepared:

| Number | Volume of "Norit A" in n-heptane suspension, ml. | Amount of "Norit A" on filter paper, mg. |
|---|---|---|
| 1 | 0 | 0 |
| 2 | 0.2 | 0.4 |
| 3 | 0.6 | 0.12 |
| 4 | 1.0 | 0.2 |
| 5 | 1.5 | 0.3 |
| 6 | 2.0 | 0.4 |
| 7 | 2.5 | 0.5 |
| 8 | 3.0 | 0.6 |
| 9 | 3.5 | 0.7 |
| 10 | 4.0 | 0.8 |
| 11 | 5.0 | 1.0 |
| 12 | 6.0 | 1.2 |
| 13 | 7.0 | 1.4 |
| 14 | 8.0 | 1.6 |
| 15 | 9.0 | 1.8 |
| 16 | 10.0 | 2.0 |
| 17 | 20.0 | 4.0 |
| 18 | 30.0 | 6.0 |
| 19 | 40.0 | 8.0 |
| 20 | 50.0 | 10.0 |

EXAMPLE V

A sample (200 ml.) of a No. 2 fuel oil (described as a hydrogenated blend that is high in catalytically cracked components and contains no additives) which is stable except at elevated temperatures, was extracted eight times with 30 ml. portions of a hydrate of dichlorotetrafluoroacetone containing 2.5 moles of water $$(C_3F_4Cl_2O \cdot 2.5H_2O)$$

The treated oil was washed with dilute aqueous alkali, water and dried. The properties of the treated and untreated oils, before and after heating at 300° F. for 90 minutes are shown below.

| Oil | ASTM color (D-1500) | | Blotter rating |
|---|---|---|---|
| | Before heating | After heating | |
| Untreated | L1.5 | L5.5 | 18 |
| Treated | 0.5 | 1.5 | 2 |

Again, it is apparent that the treated oil is more stable than the untreated oil.

EXAMPLE VI

The fuel oil used herein was an uninhibited blend of catalytically cracked cycle stock and straight run distillate (Ashland Catlettsburg). Samples of this oil were extracted one (I), two (II) and five (V) times with equal volumes of a hydrate prepared by reacting hexafluoroacetone with 1.6 moles of water ($C_3F_6O \cdot 1.6H_2O$). The extracted oils were washed with water, 5% caustic and water, dried, and tested by heating at 300° F. for 90 minutes with the results shown below.

| Oil | ASTM color (D-1500) | | Blotter rating |
|---|---|---|---|
| | Before heating | After heating | |
| Untreated | 1.0 | L6.0 | 16 |
| Treated I | L0.5 | 5.0 | 6 |
| Treated II | L0.5 | L3.5 | 4 |
| Treated V | L0.5 | 3.0 | 3 |

Treatment obviously improves stability. Continued treatment continues to improve stability. The hexafluoroacetone hydrate was recovered and reused.

Samples of the same oil were extracted with equal volumes of the dichlorotetrafluoroacetone hydrate containing 2.5 moles of water ($C_3F_4Cl_2O \cdot 2.5H_2O$) one (1), two (II) and five (V) times. After washing with caustic and water and drying as before, the oil samples were heated at 300° F. for 90 minutes with the results shown below. The hydrate was recovered and reused.

| Oil | ASTM color (D-1500) | | Blotter rating |
|---|---|---|---|
| | Before heating | After heating | |
| Untreated | L2.0 | L7.0 | 17 |
| Treated (I) | 0.5 | L2.5 | 3 |
| Treated (II) | L0.5 | L1.5 | 2 |
| Treated (V) | L0.5 | L1.5 | 2 |

Here again treatment improves stability. This time, more than two extractions appear to cause no further improvement.

EXAMPLE VII

It was found in Examples V and VI that the polyhaloketone hydrates became green in color after they had been used to extract the fuel oil samples. The other polyhaloketone hydrates listed below also became green in color when used to extract the oil of Example VI. The oil products obtained had approximately the same properties as the product of Example VI after the one extraction with the dichlorotetrafluoroacetone 2.5 hydrate, i.e., ASTM Color (D-1500) of 0.5 before heating, ASTM Color (D-1500) of 2.5 after heating, and a blotter rating of 3 (all calculated).

$F(CF_2)_3CO(CF_2)_3F \cdot H_2O$   $CCl_3CO(CF_2)_2H \cdot H_2O$
$CFCl_2COCF_2CF_2H \cdot H_2O$   $(C_2F_5)_2CO \cdot H_2O$
$H(CF_2)_2CO(CF_2)_4H \cdot H_2O$   $CF_2ClCO(CF_2)_2H \cdot H_2O$
$CF_3COCF_2Cl \cdot 1.5H_2O$   $CFCl_2COCF_2Cl \cdot 1.5H_2O$
$CF_2ClCOCF_2Cl \cdot 1.5H_2O$

EXAMPLE VIII

Approximately 0.01% by weight mercaptan sulfur as tertiary amyl mercaptan was added to a fluid, catalytically cracked naphtha. This mixture was then extracted with an equal volume of the hydrate of dichlorotetrafluoroacetone containing 2.5 moles of water $$(C_3F_4Cl_2O \cdot 2.5H_2O)$$

The thus extracted gasoline was analyzed for mercaptan sulfur with the following results.

| Gasoline | Mercaptan sulfur, g./100 ml. | Odor |
|---|---|---|
| Untreated | 0.0091 | Sour. |
| Treated | 0.0037 | Sweet. |

Thus, one simple extraction of the simplest sort decreases the amount of mercaptan sulfur by a factor of 2.4–2.5. It also removes the "sour" odor of the gasoline. Five extractions of this type remove the mercaptan sulfur to below a detectable point.

EXAMPLE IX

A series of further extractions were carried out on two fuel oils as shown in Table III below. Fuel oil A was a No. 2 fuel oil blend of catalytically cracked cycle stock and straight run distillate containing no additives. Fuel oil B was a No. 2 fuel oil blend, high in catalytically cracked components, hydrogenated to reduce olefines, and containing 36% aromatic hydrocarbons, 1.5% olefines, and 62.5% saturated hydrocarbons by volume, and no additives. Hydrates of dichlorotetrafluoroacetone were used in the extractions. The oil samples were not washed with water or alkali after extraction, but the hydrates dissolved in the oils were removed by distillation which required heating the raffinates to 176° C. (380° F.). Thus, the samples of the treated oil received two heat treatments rather than just that of the test. This procedure is not recommended and should be avoided. The results are shown in Table III.

*Table III*

| Test | Oil type | Grams | Moles H₂O in hydrate | Grams hydrate/extraction | No. of extractions | Heating at 300° F. for 90 min. | | Blotter rating |
|---|---|---|---|---|---|---|---|---|
| | | | | | | ASTM color (D-1500) | | |
| | | | | | | Before | After | |
| 1 | A | (¹) | | | | 1.0 | L5.0 | 16 |
| 2 | A | 100 | 2 | 100 | 2 | 1.0 | 2.5 | 2 |
| 3 | A | 100 | 2 | 10 | 2 | L3.5 | 8.0 | 6 |
| 4 | A | 100 | 3 | 100 | 2 | L1.0 | 5.0 | 5 |
| 5 | A | 100 | 4 | 100 | 2 | L1.0 | L4.0 | 3 |
| 6 | B | (¹) | | | | L1.0 | L4.5 | 17 |
| 7 | B | 100 | 2 | 100 | 2 | L1.0 | 0.5 | 1 |
| 8 | B | 100 | 2 | 10 | 2 | 1.0 | 2.0 | 2 |
| 9 | B | 100 | 3 | 100 | 2 | L1.0 | 1.0 | 2 |
| 10 | B | 100 | 4 | 100 | 2 | L1.0 | L1.5 | 2 |

¹ Untreated.

These results show that the degree of hydration of the hydrate, the ratio of weight of hydrate to weight of distillate, and the number of extractions, all affect the results. Insufficient hydrate for best results was used in some cases. The number of extractions required depends upon the degree of stability of the oil that is desired and it is not possible to overtreat the oil.

EXAMPLE X

In many cases, it is desirable to remove aromatic hydrocarbons from petroleum distillates, for example, aromatic hydrocarbons are undesirable in jet fuels and lubricating oils. The separation of aromatic hydrocarbons from paraffins and naphthenic hydrocarbons was demonstrated by treatment of (1) a mixture of equal volumes of toluene and n-heptane and (2) a mixture of equal volumes of methylcyclohexane and n-heptane with the dihydrate of dichlorotetrafluoroacetone (containing 2 moles of water of hydration). Each mixture of hydrocarbons was extracted once with an equal volume of the dihydrate. After separation of the hydrocarbons from the dihydrate, the relative concentrations of the various hydrocarbons were determined in each case by vapor phase chromatography. From the analyses, it was determined that the solubility of toluene was favored over n-heptane by a factor of 5.7, and the solubility of methylcyclohexane was favored over n-heptane by a factor of 1.7. Thus, the solubility of toluene is favored over methylcyclohexane by about 3.3.

Using extractive procedures similar to that of Example X with dichlorotetrafluoroacetone dihydrate, it was shown that n-amylbenzene, n-heptylbenzene, 1-methylnaphthalene, 2-methylnaphthalene, 1,3,5-triisopropylbenzene and para-tert.-butyltoluene were similarly separated from paraffinic and naphthenic hydrocarbons, i.e., from n-heptane and methylcyclohexane.

It will be understood that the preceding examples have been given for illustrative purposes solely, and that this invention is not limited to the specific embodiments described therein. On the other hand, it will be readily apparent to those skilled in the art that, subject to the limitations set forth in the general description, many variations can be made in the materials treated and employed, in the proportions, and in the conditions and techniques employed without departing from the spirit or scope of this invention.

From the foregoing description, it will be apparent that this invention provides a novel process for the selective solvent treatment, extraction, and refining of petroleum distillates, whereby various impurities and undesired components of the petroleum distillates can be effectively removed and the quality and properties of the petroleum distillates significantly improved. The process is simple, and readily carried out, employing equipment and techniques which are well known and conventional in the art. Accordingly, it is apparent that this invention costitutes a valuable contribution to and advance in the art.

The embodiments of the invention in which an exclusive property or privilege is claimed are defined as follows:

1. The process for the selective solvent refining of petroleum distillates, which process comprises
    (A) intimately contacting 1 volume of the petroleum distillate to be refined in the liquid phase at a temperature of from about 0° C. to about 100° C.
    (B) with at least 0.1 volume of a liquid hydrate of a saturated aliphatic polyhaloketone in which the polyhaloketone consists of
        (a) 3 to 15 carbon atoms,
        (b) one oxygen atom,
        (c) 0 to 2 hydrogen atoms, and
        (d) halogen atoms of atomic numbers 9–17 of which at least 50 atom percent are fluorine atoms, there being no more than 1 hydrogen atom on a carbon atom adjacent to the CO group,
    said hydrate containing 1 to about 10 moles of water of hydration per mole of polyahaloketone sufficient to form a two-phase system of (1) a liquid hydrate solvent phase and (2) a liquid raffinate phase, and
    (c) then separating the raffinate phase from the solvent phase.

2. The process for the selective solvent refining of petroleum distillates, which process comprises
    (A) intimately contacting 1 volume of the petroleum distillate to be refined in the liquid phase at a temperature of from about 0° C. to about 100° C.
    (B) with at least 0.1 volume of a liquid hydrate of a saturatde acyclic polyhaloketone in which the polyhaloketone consists of
        (a) 3 to 15 carbon atoms,
        (b) one oxygen atom,
        (c) 0 to 2 hydrogen atoms, and
        (d) halogen atoms of atomic numbers 9–17 of which at least 50 atom percent are fluorine atoms, there being no more than 1 hydrogen atom on a carbon atom adjacent to the CO group,
    said hydrate containing 1 to about 10 moles of water of hydration per mole of polyhaloketone sufficient to form a two-phase system of (1) a liquid hydrate solvent phase and (2) a liquid raffinate phase, and
    (C) then separating the raffinate phase from the solvent phase.

3. The process for the selective solvent refining of petroleum distillates, which process comprises
    (A) intimately contacting 1 volume of the petroleum distillate to be refined in the liquid phase at a temperature of from about 25° C. to about 80° C.
    (B) with at least 0.1 volume of a liquid hydrate of a saturated acyclic polyhaloketone in which the polyhaloketone consists of
        (a) 3 to 7 carbon atoms,
        (b) one oxygen atom,
        (c) 0 to 2 hydrogen atoms, and
        (d) halogen atoms of atomic numbers 9–17 of which at least 50 atoms percent are fluorine atoms, there being no more than 1 hydrogen atom on a carbon atom adjacent to the CO group,
    said hydrate containing 1 to about 10 moles of water of hydration per mole of polyhaloketone sufficient to form a two-phase system of (1) a liquid hydrate solvent phase and (2) a liquid raffinate phase, and
    (C) then separating the raffinate phase from the solvent phase.

4. The process for the selective solvent refining of petroleum distillates, which process comprises
    (A) intimately contacting 1 volume of the petroleum distillate to be refined in the liquid phase at a temperature of from about 25° C. to about 80° C.
    (B) with at least about 1 volume of a liquid hydrate of a saturated acyclic polyhaloketone in which the polyhaloketone consists of
        (a) 3 to 7 carbon atoms,
        (b) one oxygen atom,
        (c) 0 to 2 hydrogen atoms, and
        (d) halogen atoms of atomic numbers 9–17 of which at least 50 atom percent are fluorine atoms, there being no more than 1 hydrogen atom on a carbon atom adjacent to the CO group,
    said hydrate containing 1 to about 10 moles of water of hydration per mole of polyhaloketone sufficient to form a two-phase system of (1) a liquid hydrate solvent phase and (2) a liquid raffinate phase, and
    (C) then separating the raffinate phase from the solvent phase.

5. The process for the selective solvent refining of petroleum distillates, which process comprises
    (A) intimately contacting 1 volume of the petroleum distillate to be refined in the liquid phase at a temperature of from about 25° C. to about 80° C.
    (B) with at least about 1 volume of a liquid hydrate of a saturated acyclic polyhaloketone in which the polyhaloketone consists of
        (a) 3 to 7 carbon atoms,
        (b) one oxygen atom,
        (c) 0 to 2 hydrogen atoms, and
        (d) halogen atoms of atomic numbers 9–17 of which at least 50 atom percent are fluorine atoms, there being no more than 1 hydrogen atom on a carbon atom adjacent to the CO group,
    said hydrate containing 1 to about 4 moles of water of hydration per mole of polyhaloketone sufficient to form a two-phase system of (1) a liquid hydrate solvent phase and (2) a liquid raffinate phase, and
    (C) then separating the raffinate phase from the solvent phase.

6. The process for the selective solvent refining of petroleum distillates, which process comprises
    (A) intimately contacting 1 volume of the petroleum distillate to be refined in the liquid phase at a temperature of from about 0° C. to about 100° C.
    (B) with at least 0.1 volume of a liquid hydrate of a perhaloacetone in which the halogen atoms are of atomic numbers 9–17 of which at least 3 are fluorine atoms, said hydrate containing 1 to about 10 moles of water of hydration per mole of perhaloacetone sufficient to form a two-phase system of (1) a liquid hydrate solvent phase and (2) a liquid raffinate phase, and
    (C) then separating the raffinate phase from the solvent phase.

7. The process for the selective solvent refining of petroleum distillates, which process comprises (A) inimately contacting 1 volume of the petroleum distillate to be refined in the liquid phase at a temperature of from about 25° C. to about 80° C.
(B) with at least about 1 volume of a liquid hydrate of a perhaloacetone in which the halogen atoms are of atomic numbers 9–17 of which at least 3 are fluorine atoms, said hydrate containing 1 to about 4 moles of water of hydration per mole of perhaloacetone sufficient to form a two-phase system of (1) a liquid hydrate solvent phase and (2) a liquid raffinate phase, and
(C) then separating the raffinate phase from the solvent phase, 8. The process for the selective solvent refining of petroleum distillates, which process comprises
(A) intimately contacting 1 volume of the petroleum distillate to be refined in the liquid phase at a temperature of from about 25° C. to about 80° C.
(B) with at least about 1 volume of a liquid hydrate of dichlorotetrafluoroactone, said hydrate containing 1 to about 10 moles of water of hydration per mole of dichlorotetrafluoroacetone sufficient to form a two-phase system of (1) a liquid hydrate solvent phase and (2) a liquid raffinate phase, and
(C) then separating the raffinate phase from the solvent phase.

9. The process for the selective solvent refining of petroleum distillates, which process comprises
(A) intimately contacting 1 volume of the petroleum distillate to be refined in the liquid phase at a temperature of from about 25° C. to about 80° C.
(B) with at least about 1 volume of a liquid hydrate of hexafluoroacetone, said hydrate containing 1 to about 10 moles of water of hydration per mole of hexafluoroacetone sufficient to form a two-phase system of (1) a liquid hydrate solvent phase and (2) a liquid raffinate phase, and
(C) then separating the raffinate phase from the solvent phase.

No references cited.